Patented Nov. 13, 1934

1,980,432

UNITED STATES PATENT OFFICE 1,980,432

GRANULAR MATERIAL

Henry R. Power, Niagara Falls, N. Y., assignor to The Carborundum Company, Niagara Falls, N. Y., a corporation of Pennsylvania No Drawing. Application February 25, 1933, Serial No. 658,665

7 Claims. (Cl. 51—278)

This invention relates to improved garnet and to a method of producing the same.

An object of the invention is to provide granular garnet in which the deficiencies of the material as it is found in nature have been minimized or eliminated without introducing other undesirable characteristics and without reducing the inherent valuable properties of the material.

Further and more specific objects of my invention will become evident by reference to the disclosure.

Garnet, which still is used extensively in some abrading operations, is found in nature as a mixture of garnets, each having the same general formula; namely, $3RO, R'_2O_3, 3SiO_2$. Examples of the constituent minerals are almandite ($3FeO, Al_2O_3, 3SiO_2$), pyrope ($3MgO, Al_2O_3, 3SiO_2$), grossulante ($3CaO, Al_2O_3, 3SiO_2$), spessartite ($3MnO, Al_2O_3, 3SiO_2$) and andradite ($3CaO, Fe_2O_3, 3SiO_2$). These minerals are found mixed in different proportions; e.g., the so-called North River garnet and the so-called Barton garnet have been found to include the following:

|  | North River | Barton |
| --- | --- | --- |
|  | Percent | Percent |
| Almandite | 54.4 | 50.4 |
| Pyrope | 29.4 | 34.2 |
| Grossulante | 16.6 | 14.1 |
| Spessartite | 1.3 | 1.1 |

The term garnet shall be used in this specification to mean both mixtures of two or more of the various types, as illustrated above, and also garnet of any one of the specific types, such as almandite, pyrope and so forth.

The method usually employed heretofore in preparing the garnet for use has been as follows. The rock bearing the garnet is crushed, after which the mineral is separated therefrom and passed over concentrating tables. The concentrated garnet then is graded to the desired sizes and is ready for use.

In practicing my invention I give the garnet, either before or after it has undergone concentration, but preferably after the concentrating operation, a heat treatment in a non-oxidizing atmosphere, whereby the physical properties of the garnet, particularly those having a bearing upon its abrading characteristics, are improved. There is not, however, any appreciable change in the color of the garnet.

I have found that a roasting temperature of approximately 900° C. is most satisfactory commercially because the time required at that temperature to produce the improved physical properties is less than that required at lower temperatures and also because that temperature is below the temperature at which fusion of the garnet begins.

The gases that I have found to be suitable for atmospheres in which to roast the garnet in accordance with my invention include nitrogen, hydrogen, carbon dioxide, argon, helium and methane.

The improvement in the garnet obtained by a roasting or heat treatment can be determined by measuring the resistance it offers to fracturing by impact. This is done by projecting the grain, which has been closely graded as to particle size, against a solid steel body with a given force and then determining the change in particle size of the granular material. The result is expressed as the "toughness modulus" of the material. A material having a "toughness modulus" of 100 would be a material that was of exactly the same particle size after being projected against the steel plate as it was before.

I have found that the garnet embodying my invention has a "toughness modulus" at least 25% greater than that of the same material before undergoing treatment. Garnet that has been oxidized, as by roasting in an oxidizing atmosphere, on the other hand, has a "toughness modulus" that is substantially the same as unroasted garnet excepting when the roasting is carried out at a temperature within the range of temperatures at which there is incipient fusion of the garnet, and incipient fusion dulls the cutting edges and points by rounding them off. Thus, the garnet of my invention not only is tougher than oxidized garnet but it also is sharper.

Although I do not wish to be limited by the following explanation, it is my belief that the garnet of my invention is superior to that previously known because the heat treatment to which I subject the material relieves internal stresses without introducing others, such as that incident to oxidation of one or more of the constituents.

Oxidation from the ferrous condition to the ferric condition, as has been proposed in the past, involves a change in the structure of the garnet molecule with the consequent setting up of stresses by molecular forces. In practicing my invention, however, I do not alter the chemical composition of the constituents of the garnet and hence do not introduce stresses.

The garnet of my invention is particularly suited to abrading operations, for which it can be used either as loose granules, as in glass polishing, as a coating on paper or cloth, or bonded in the form of wheels, rubs and so forth. Its tougher character causes it to resist fracture by the forces applied to it, driving grinding to a much greater extent than either the unroasted garnet or garnet that has been oxidized.

Having thus described my invention, what I claim is:

1. A method of heat treating garnet comprising heating the garnet, while it is in non-oxidizing atmosphere, to a temperature below that at which incipient fusion begins.

2. A method of heat treating garnet comprising heating the garnet, where it is in non-oxidizing atmosphere, to a temperature of approximately 900° C.

3. A method of heat treating garnet comprising heating the garnet, while it is in an atmosphere of nitrogen, to a temperature below that at which incipient fusion begins.

4. A method of heat treating garnet comprising heating the garnet, while it is in an atmosphere of hydrogen, to a temperature below that at which incipient fusion begins.

5. A method of heat treating garnet comprising heating the garnet, while it is in an atmosphere of $CH_4$, to a temperature below that at which incipient fusion begins.

6. Granular garnet substantially identical with the product obtainable by heating natural garnet in a non-oxidizing atmosphere, to a temperature below that at which incipient fusion begins.

7. As an article of manufacture, garnet which has been rendered tougher than natural garnet by approximately 25% by heating the raw garnet in a non-oxidizing atmosphere to a temperature below that at which incipient fusion begins.

HENRY R. POWER.